US012688872B1

(12) United States Patent
Xiao et al.

(10) Patent No.: US 12,688,872 B1
(45) Date of Patent: Jul. 21, 2026

(54) DATA STORAGE DEVICE WITH REAL TIME FLY HEIGHT PREDICTOR FOR DIFFERENT SERVO SEEK SEQUENCES AND OTHER DRIVE OPERATIONS

(71) Applicant: WESTERN DIGITAL TECHNOLOGIES, INC., San Jose, CA (US)

(72) Inventors: Sandy Xianghui Xiao, San Diego, CA (US); Noureddine Kermiche, Dana Point, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 19/028,308

(22) Filed: Jan. 17, 2025

(51) Int. Cl.
$G11B\ 5/60$      (2006.01)
$G11B\ 5/02$      (2006.01)
$G11B\ 5/55$      (2006.01)

(52) U.S. Cl.
CPC ................ *G11B 5/607* (2013.01); *G11B 5/02* (2013.01); *G11B 5/5547* (2013.01); *G11B 5/6029* (2013.01)

(58) Field of Classification Search
None
See application file for complete search history.

(56) References Cited

U.S. PATENT DOCUMENTS

| | | | |
|---|---|---|---|
| 7,375,914 B1 * | 5/2008 | Dieron .................... | G11B 5/314 |
| 8,922,939 B1 | 12/2014 | Knigge et al. | |
| 8,964,324 B1 * | 2/2015 | Watanabe .............. | G11B 5/607 |
| | | | 360/75 |
| 9,842,617 B1 | 12/2017 | Haralson et al. | |
| 10,311,905 B1 | 6/2019 | Guo et al. | |
| 11,715,493 B1 | 8/2023 | Schreck et al. | |
| 2003/0007279 A1 * | 1/2003 | Johnson ................. | G11B 21/21 |
| 2007/0188907 A1 * | 8/2007 | Satoh ..................... | G11B 27/36 |
| 2007/0268612 A1 * | 11/2007 | Fitzpatrick ........... | G11B 5/6005 |
| 2007/0268614 A1 * | 11/2007 | Henry .................... | G11B 5/607 |
| 2007/0268615 A1 | 11/2007 | McFadyen et al. | |
| 2008/0068739 A1 * | 3/2008 | Oyamada ............. | G11B 5/6005 |

(Continued)

OTHER PUBLICATIONS

Boettcher et al., "Dynamic Flying Height Adjustment in Hard Disk Drives Through Feedforward Control", http://maeresearch.ucsd.edu/callafon/publications/2011/UweIEEETonM.pdf, IEEE Transactions on Magnetics, vol. 47, No. 7, Jul. 2011, 7 pages.

(Continued)

*Primary Examiner* — Peter Vincent Agustin

(74) *Attorney, Agent, or Firm* — Calderon Safran & Wright P.C.

(57) ABSTRACT

Various illustrative aspects are directed to a data storage device, method, and one or more processing devices that are configured to: store heater power history data defining historic levels of heater power applied to the heater in the selected head; based on the heater power history data, select one or more calibrations from plural calibrations that define relationships between the fly height of the selected head and different levels of heater power change; and determine a predicted fly height of the selected head over a target sector of the one or more disks using the selected one or more calibrations and the heater power history data.

22 Claims, 6 Drawing Sheets

$$FHC_1 = A_1{}^*exp(B_1{}^*X) + C_1{}^*exp(D_1{}^*X) \leftarrow 341$$

$$FHC_2 = A_2{}^*exp(B_2{}^*X) + C_2{}^*exp(D_2{}^*X) \leftarrow 342$$

(56) References Cited

U.S. PATENT DOCUMENTS

| | | | |
|---|---|---|---|
| 2008/0247073 A1* | 10/2008 | Park | G11B 5/3136 360/59 |
| 2009/0067095 A1* | 3/2009 | Mak | G11B 17/32 360/235.5 |
| 2009/0141390 A1* | 6/2009 | Oyamada | G11B 5/455 360/97.12 |
| 2009/0195912 A1 | 8/2009 | Sato | |
| 2009/0225461 A1* | 9/2009 | Aoki | G11B 5/6064 360/76 |
| 2010/0142092 A1* | 6/2010 | Bolasna | G11B 5/6029 |
| 2011/0157736 A1 | 6/2011 | Contreras et al. | |
| 2013/0250446 A1 | 9/2013 | Zeng et al. | |
| 2023/0062615 A1 | 3/2023 | Wang et al. | |
| 2024/0290348 A1 | 8/2024 | Xiao et al. | |

OTHER PUBLICATIONS

Matthes, "Experimental studies of the head-disk interface from a tribological and controls point of view for flying heights below 2 nm", https://tinyurl.com/mwv7prvr, University of California, San Diego, 2016, 204 pages.
Boettcher et al., "Servo Signal Data Processing for Flying Height Control in Hard Disk Drives", https://cmrr.ucsd.edu/_files/research-highlights/highlight-33-2.pdf, CMRR Report No. 33, Winter 2010, 4 pages.

* cited by examiner

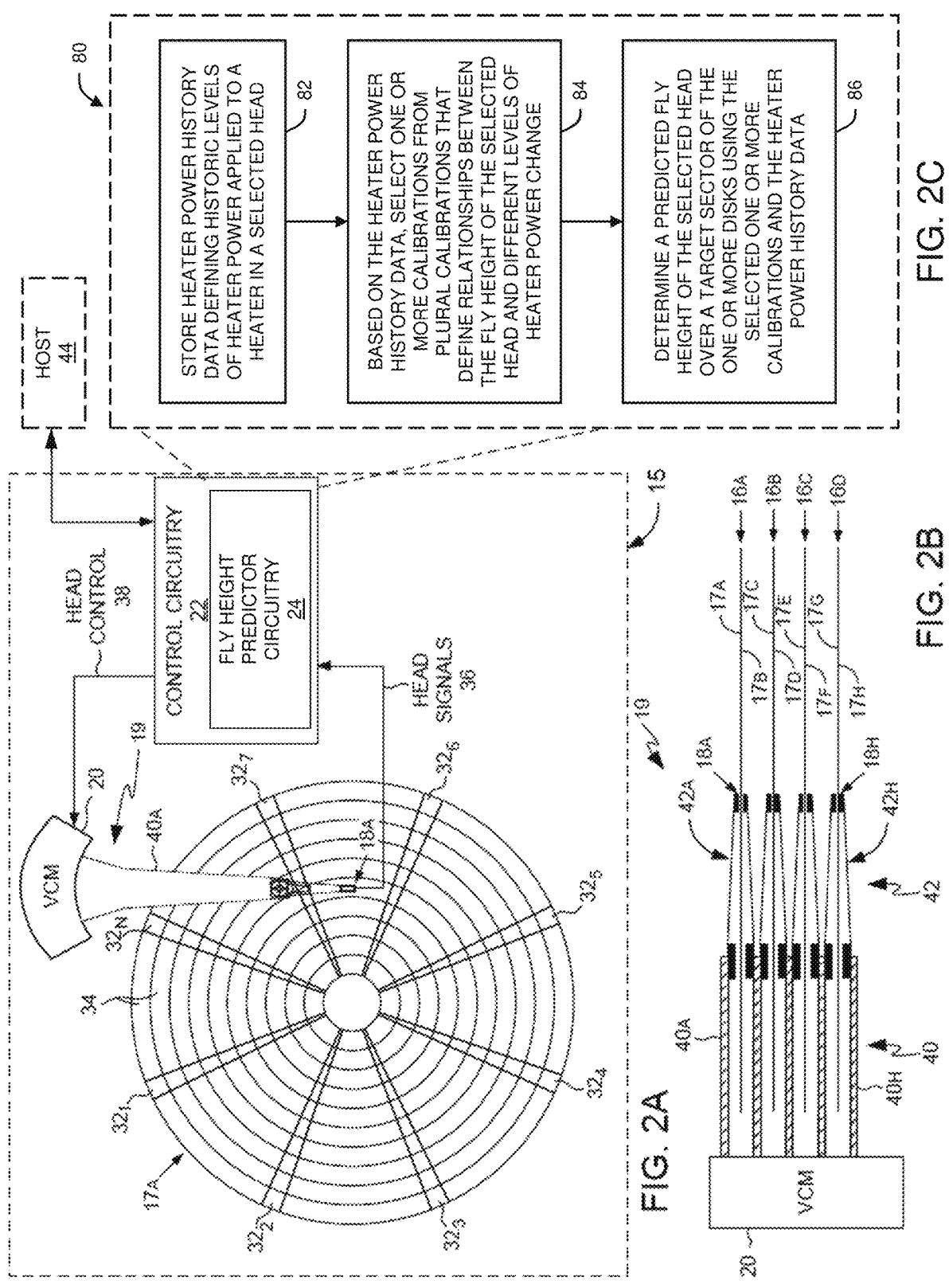

STORE HEATER POWER HISTORY DATA DEFINING HISTORIC LEVELS OF HEATER POWER APPLIED TO A HEATER IN A SELECTED HEAD

82

BASED ON THE HEATER POWER HISTORY DATA, SELECT ONE OR MORE CALIBRATIONS FROM PLURAL CALIBRATIONS THAT DEFINE RELATIONSHIPS BETWEEN THE FLY HEIGHT OF THE SELECTED HEAD AND DIFFERENT LEVELS OF HEATER POWER CHANGE

84

DETERMINE A PREDICTED FLY HEIGHT OF THE SELECTED HEAD OVER A TARGET SECTOR OF THE ONE OR MORE DISKS USING THE SELECTED ONE OR MORE CALIBRATIONS AND THE HEATER POWER HISTORY DATA

FIG. 2A $$FHC_1 = A_1{}^*exp(B_1{}^*X) + C_1{}^*exp(D_1{}^*X)$$

$$FHC_2 = A_2{}^*exp(B_2{}^*X) + C_2{}^*exp(D_2{}^*X)$$

$FHC_3 = A_3*exp(B_3*X) + C_3*exp(D_3*X)$ 441

$FHC_4 = A_4*exp(B_4*X) + C_4*exp(D_4*X)$ 442

DATA STORAGE DEVICE WITH REAL TIME FLY HEIGHT PREDICTOR FOR DIFFERENT SERVO SEEK SEQUENCES AND OTHER DRIVE OPERATIONS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 61 comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

SUMMARY

As data storage device technology advances, spacing between the head and the surface of the storage medium is getting increasingly close, and may be in the sub-nanometer range in some examples. Data storage devices may be very sensitive to changes in spacing between the head and the surface of the storage medium.

Increasing the distance reduces the strength and accuracy of the fields used to write and read data to and from the storage medium, while decreasing the distance risks contact between the head and storage medium, which can have undesirable consequences. Data storage devices have incorporated active fly height control that uses a fly height actuator to adjust the distance between the head and the storage medium, which distance may be referred to as fly height, head-to-media spacing (HMS), or clearance. One type of fly height control is thermal fly height control (TFC), which uses one or more electrically resistive heaters in the head to change the shape of the head. When electrical power is applied to such a heater, the heater expands and causes the head to expand and thus move closer to the disk surface, thereby decreasing the fly height. The head can be adjusted to different fly heights in this manner, depending on whether the data storage device is seeking, reading from the disk, or writing to the disk. In TFC systems, the heater must be accurately calibrated so that the head-to-media spacing can be controlled in steady state conditions.

Firmware of data storage devices, such as disk drives, may be programmed with very sophisticated and complex algorithms for controlling the power applied to the heater (also called the heater power) for the purpose of controlling the fly height of the head at different times and in different situations. In one example, a preheat power may be applied to the heater prior to a read or write operation at one or more sectors of the disk. Reducing the fly height prior to arriving at the first sector (e.g., target sector) of a write operation can help avoid the problem of a cold write. Reducing the fly height prior to arriving at the first sector (e.g., target sector) of a read operation can reduce the read error recovery probability. Preheating in this manner can involve a significant amount of time. For example, some preheats require an amount of time equivalent to the head traveling over fifty sectors on the disk surface. For this reason, the preheat power may be kept on between one operation and the next operation if there is a sufficiently short seek between the two operations. However, for longer seeks between operations, the preheat power may be turned off for power savings and to extend the life of the disk drive. In another example, a boosted preheat power may be applied during a relatively short seek time to reduce the time involved in adjusting the fly height.

The algorithms for controlling the power applied to the heater for the purpose of controlling the fly height generally work well when the starting and ending points of a seek are fixed. Starting and ending points of a seek may be defined in terms of sectors of the disk surface, which may be defined in terms of a logical block address (LBA). However, in current disk drives, the control circuitry might change the ending point of a seek after the seek has commenced (e.g., while the seek is in progress). For example, a small error in actuator speed can cause the head to miss the ending point of a seek, which may be referred to as the target sector. When the head misses the target sector, the control circuitry may be programmed to wait almost an entire revolution of the disk to reach this target sector, or the control circuitry may be programmed to perform another operation in that time, such as select a different operation (e.g., from the task queue) that begins at a different target sector that can be reached in less than one revolution. Dynamically adapting to perform different operations in this manner can increase the speed at which a group of operations is completed, which improves the performance of the disk drive. However, dynamically changing the ending point of a seek in this manner introduces complexities into the fly height control process. These complexities can reveal design or coding bugs (e.g., in the TFC heater control programming) that do not affect static seek operations (e.g., seeking from a fixed starting point to a fixed ending point), but which produce sub-optimal fly heights during special drive operation paths (e.g., dynamically changing the ending point when the seek is already in progress).

Implementations of the present disclosure address these issues by providing a data storage device, method, and one or more processing devices that are configured to accurately predict fly height during special drive operation paths, such as when the drive control circuitry dynamically changes the ending point of a seek after the seek has begun. Various embodiments involve determining calibrations that define relationships between change in heater power and resulting change in fly height for plural different magnitudes of change in heater power. In embodiments, the calibrations are based on heating timing profiles that comprise measured values of fly height that occur over time as a result of a change in heater power from a low value to a high value, and cooling timing profiles that comprise measured values of fly height that occur over time as a result of a change in heater power from a high value to a low value. In embodiments, the calibrations include curves that are fit to the respective heating timing profiles and cooling timing profiles. In embodiments, the calibrations are determined during manufacturing and testing of the disk drive and stored in persistent storage, such as firmware, prior to the disk drive being put into use with an end user. In accordance with aspects of the present disclosure, when the disk drive is in use with an end user, control circuitry of the disk drive is configured to store heater power history data that defines respective levels of heater power applied during the most recent "n" number of sectors. In embodiments, the control circuitry selects one or more of the calibrations that are associated with changes in heater power that correspond to the levels of heater power applied in the most recent "n" number of sectors as indicated in the heater power history data. In embodiments, the control circuitry uses the heater power history data and the selected calibrations to calculate a predicted fly height for each of the most recent "n" number of sectors, and to predict a fly height for the next sector that follows the most recent "n" number of sectors in a seek. In embodiments, if the predicted fly height of the next sector is within a tolerance of an expected value, then the control circuitry performs the read or write operation associated with the next sector. In embodiments, if the predicted fly height of the next sector is not within a tolerance of the expected value, then the control circuitry performs an alternate action, such as aborting the operation, adjusting the heater power, or adjusting the duration of the heater power.

Various illustrative aspects are directed to a data storage device comprising: one or more disks; an actuator mechanism configured to position a selected head among one or more heads proximate to a corresponding disk surface of a corresponding disk among the one or more disks, the selected head including a heater associated with adjusting a fly height of the selected head; and one or more processing devices. The one or more processing devices, individually or in combination, are configured to: store heater power history data defining historic levels of heater power applied to the heater in the selected head; based on the heater power history data, select one or more calibrations from plural calibrations that define relationships between the fly height of the selected head and different levels of heater power change; and determine a predicted fly height of the selected head over a target sector of the one or more disks using the selected one or more calibrations and the heater power history data.

Various illustrative aspects are directed to a method comprising: storing heater power history data defining historic levels of heater power applied to the heater in the selected head; based on the heater power history data, selecting one or more calibrations from plural calibrations that define relationships between the fly height of the selected head and different levels of heater power change; and determining a predicted fly height of the selected head over a target sector of the one or more disks using the selected one or more calibrations and the heater power history data.

Various illustrative aspects are directed to one or more processing devices comprising: means for storing heater power history data defining historic levels of heater power applied to the heater in the selected head; means for selecting, based on the heater power history data, one or more calibrations from plural calibrations that define relationships between the fly height of the selected head and different levels of heater power change; and means for determining a predicted fly height of the selected head over a target sector of the one or more disks using the selected one or more calibrations and the heater power history data.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, in accordance with aspects of the present disclosure.

DETAILED DESCRIPTION

Figure 1:
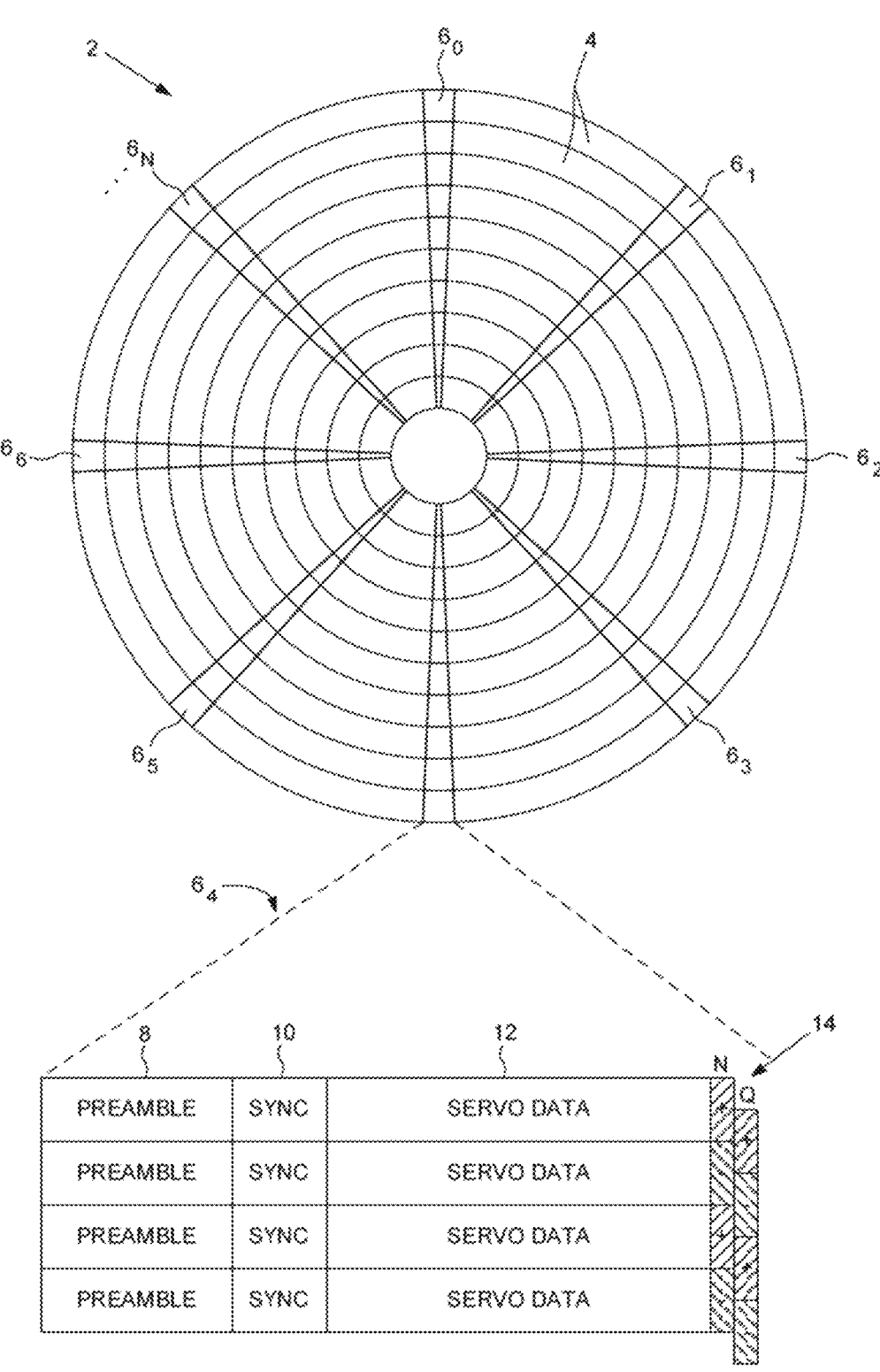
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that fly height predictor circuitry 24 of control circuitry 22 may perform or execute in controlling the operations of disk drive 15, in accordance with aspects of the present disclosure, including a real time fly height predictor for different servo seek sequences.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, fly height predictor circuitry 24 of control circuitry 22 may store heater power history data defining historic levels of heater power applied to the heater in the selected head (82). Fly height predictor circuitry 24 may further, based on the heater power history data, select one or more calibrations from plural calibrations that define relationships between the fly height of the selected head and different levels of heater power change (84). Fly height predictor circuitry 24 may further determine a predicted fly height of the selected head over a target sector of the one or more disks using the selected one or more calibrations and the heater power history data (86). Control circuitry 22, including fly height predictor circuitry 24, may further perform additional actions, methods, and techniques, in accordance with various aspects including as further described herein.

The term "fly height predictor circuitry 24" as used herein may refer to any hardware, firmware, software, and/or combination thereof, comprised in control circuitry 22 of disk drive 15, which implements, embodies, or engages in any of the structures or functions ascribed herein to fly height predictor circuitry 24 or to any other of the novel and inventive aspects of the present disclosure. Fly height predictor circuitry 24 may constitute any hardware, firmware, software, and/or any other elements of control circuitry 22 for real time fly height predictor for different servo seek sequences, and performing other techniques and methods as described herein.

Figure 2D:
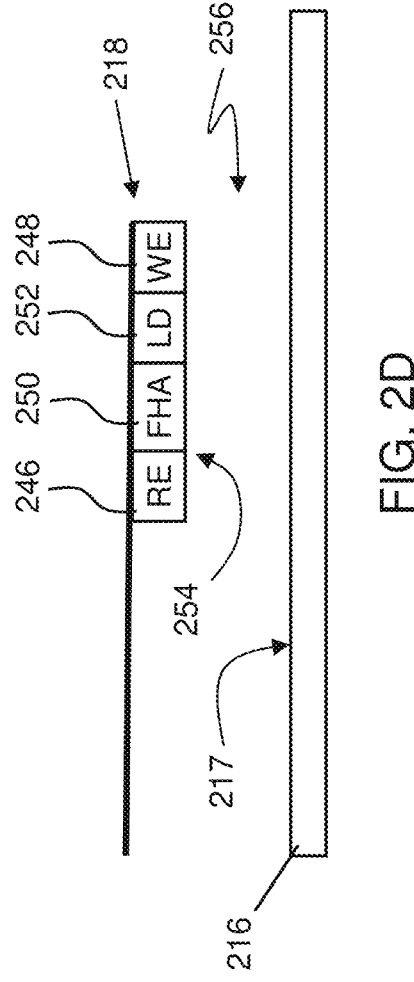
FIG. 2D depicts a conceptual side view diagram of a head of a disk drive, suspended above and operating proximate to a corresponding disk surface in accordance with various aspects of the present disclosure.

FIG. 2D depicts an example head 218 usable in a disk drive such as disk drive 15 of FIGS. 2A and 2B. In particular, FIG. 2D shows a disk 216 that corresponds to one of disks 16 and a head 218 that corresponds to one of heads 18. The arrangement or disposition of elements of heads 18 of FIG.

2B described herein is not limited to any specific detail as shown in FIG. 2D, and the elements of heads 18 of FIG. 2B may be arranged in any of a variety of other configurations in other examples.

In embodiments, and with continued reference to FIG. 2D, head 218 includes a read element 246 (e.g., a magnetoresistive (MR) element), a write element 248 (e.g., an inductive write coil), a fly height actuator 250 (e.g., a thermal fly height control (TFC) element that actuates through thermal expansion), and an assistive energy emitter comprising a laser diode 252, in one example, that is configured for use with heat-assisted magnetic recording (HAMR). Energy-assisted magnetic recording heads in other examples of this disclosure may use any other applicable form of assistive energy emitter, such as a microwave emitter for microwave-assisted magnetic recording (MAMR), as another example. In embodiments, control circuitry 22 (shown in FIG. 2A) writes data to disk surface 217 by modulating a write current in an inductive write coil in write element 248 to record magnetic transitions onto corresponding disk surface 217 in a process referred to as saturation recording. During readback, read element 246 senses the magnetic transitions, and a read channel demodulates the resulting read signal. Control circuitry 22 may use fly height actuator 250 to induce changes in the fly height of head 218 above disk surface 217. Laser diode 252 may be used to generate a laser that is used to temporarily heat an area of disk surface 217 prior to passing under write element 248, as is understood in a HAMR disk drive. For example, laser diode 252 may be used with a waveguide and a near-field transducer (NFT) to project a plasmon onto disk surface 217 to heat an area of disk surface 217.

In the example shown in FIG. 2D, head 218 has an air bearing surface 254 over disk surface 217 and separated from disk surface 217 by air gap 256. Head 218 may be supported over disk 216 by an actuator arm comprising a suspension assembly. The distance from disk surface 217 to air bearing surface 254 corresponds to the fly height of head 218, subject to protrusions by one or more head elements from air bearing surface 254, which may reduce the effective fly height of head 218.

In various embodiments, fly height actuator 250 is configured for fine adjustment of the fly height, for example, on a nanometer scale. Fly height actuator 250 may be operable to adjust the fly height of head 218 over disk surface 217 based on a control signal from control circuitry 22. In embodiments, fly height actuator 250 includes a heater which controls the fly height through thermal expansion. In various examples, fly height actuator 250 is configured such that applying power to the heater causes localized heating in head 218, the heating inducing a thermal expansion that causes a protrusion at or near air bearing surface 254, thereby changing the fly height which is the clearance between disk surface 217 and air bearing surface 254. Power applied to the heater is referred to herein as heater power and may be applied using electrical current. In various examples, increasing the heater power increases the protrusion and decreases the fly height, while decreasing the heater power decreases the protrusion and increases the fly height, within certain limits.

In embodiments, control circuitry 22 may apply power to the heater of fly height actuator 250 using predefined digital heater values that are converted by a digital-to-analog converter (DAC) into an analog voltage that is amplified by an amplifier to generate a heater signal that may be selectively conducted to the heater. In this manner, control circuitry 22 may utilize the predefined digital heater values to control fly height actuator 250 to maintain head 218 at a target fly height during read and write operations. When not performing read/write operations, fly height actuator 250 may be controlled to increase the fly height of head 218 so as to avoid or reduce collisions with asperities on the disk.

Various embodiments involve determining calibrations for head 218 that define relationships between change in heater power and resulting change in fly height for plural different magnitudes of change in heater power. In embodiments, the calibrations are based on heating timing profiles that comprise measured values of fly height that occur over time as a result of a change in heater power from a low value to a high value, and cooling timing profiles that comprise measured values of fly height that occur over time as a result of a change in heater power from a high value to a low value. In embodiments, the calibrations include curves that are fit to the respective heating timing profiles and cooling timing profiles. In embodiments, the calibrations are determined during manufacturing and testing of disk drive 15 and stored in persistent storage, such as firmware, prior to disk drive 15 being put into the field, e.g., being operated by an end user to store user data.

In various embodiments, measuring values of fly height that occur over time as a result of a change in heater power comprises applying different levels of change in heater power and measuring changes in servo signals that occur as a result of the change in heater power, where the servo signals are usable for measuring the fly height. An exemplary technique for measuring the fly height of a head is to evaluate the control signal applied to a variable gain amplifier (VGA) which attempts to maintain the amplitude of the read signal at a target amplitude when reading a periodic pattern from the disk, for example, a preamble in a servo sector. This technique is referred to as the servo VGA or SVGA technique. In embodiments, data for determining the calibrations is obtained by control circuitry 22 applying different levels of change in heater power to the heater of fly height actuator 250 and measuring changes in SVGA signal that occur over time as a result of the change in heater power. In embodiments, the levels of change of heater power are defined in terms of percentages of a target clearance heater power, which is a predefined level of heater power that is calibrated to cause a predefined fly height when the heater power is applied to the heater for a predefined duration. The duration may be expressed in sectors of the disk, since control circuitry 22 operates the disk drive with a highly regular angular speed and nominal sector-to-sector time interval. In a non-limiting example, a target clearance heater power comprises a heater DAC value of 420 units that, when applied to the heater for a duration of at least 50 sectors, causes thermal expansion in the head that results in a protrusion magnitude of 8100 picometers.

In accordance with aspects of the present disclosure, different respective calibrations are determined for plural different levels of heater power change for fly height actuator 250 in head 218. In one exemplary implementation, the different levels of heater power change include 10%, 20%, 30%, 40%, 50%, 60%, 70%, 80%, 90%, and 100%, and a respective calibration is determined for each of these levels. These levels are not limiting, and other levels may be used.

Figure 3:
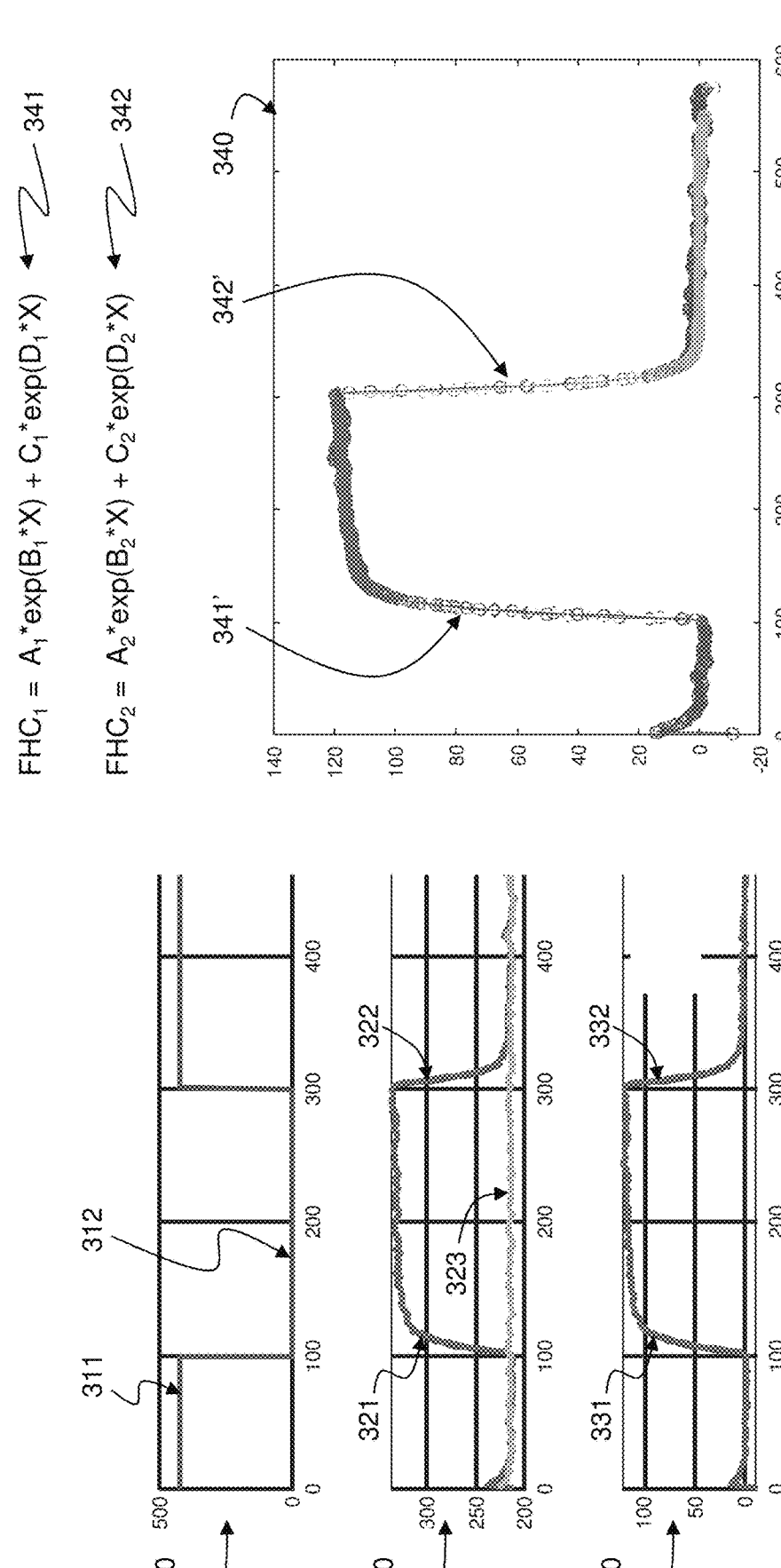
FIG. 3 shows an example of measuring values of fly height that occur over time as a result of a level of heater power change in accordance with various aspects of the present disclosure.

FIG. 3 shows an example of measuring values of fly height that occur over time as a result of a level of heater power change. In the example shown in FIG. 3, plot 310 shows heater power on the vertical axis versus time on the horizontal axis. In this example, heater power is expressed in terms of heater DAC value, i.e., the digital heater values applied to a DAC that outputs an analog voltage that is amplified to generate a heater signal that is conducted to the heater of fly height actuator 250 in head 218. In this example, time is expressed in terms of sector ID (SID) corresponding to sectors defined on disk surface 217. In this example, the heater power is applied at a first value 311 during sectors 0 through 100, then changed to a second value 312 during sectors 100 through 300, and then changed back to the first value 311 after sector 300. In this example, the first value 311 is higher than the second value 312, the first value 311 represents the target clearance heater power (e.g., a heater DAC value of 420), and the second value 312 represents a level of heater power change of 100% (a heater DAC value of 0).

With continued reference to FIG. 3, plot 320 shows measured values of SVGA signal associated with head 218 that result from the heater power levels of plot 310 being applied to the heater of fly height actuator 250 in head 218. In this example, first data 321 in plot 320 is a raw measurement of the SVGA signal that results from the heater power levels of plot 310 being applied to the heater. Second data 322 in plot 320 is a filtered raw measurement of the SVGA signal that results from the heater power levels of plot 310 being applied to the heater. Third data 323 in plot 320 is a measurement of the baseline SVGA signal that results from the heater power being applied at the first value 311 during sectors 0 through 480. Comparing plots 310 and 320 shows that decreasing the heater power from first level 311 to second level 312 increases the fly height, while increasing the heater power from second level 312 to first level 311 decreases the fly height.

With continued reference to FIG. 3, plot 330 shows values of the SVGA signal with the baseline removed. In this example, first data 331 in plot 330 corresponds to first data 321 of plot 320 minus third data 323 of plot 320 (e.g., raw minus baseline). In this example, second data 332 in plot 330 corresponds to second data 322 of plot 320 minus third data 323 of plot 320 (e.g., filtered minus baseline).

In embodiments, and as shown in the example of FIG. 3, control circuitry 22 measures values of the fly height of head 218, as represented by the SVGA signal value, as the fly height changes from a first steady state value to a second steady state value in response to a heater power change applied to the heater of fly height actuator 250. In embodiments, the measured values of fly height that occur as a result of the heater power changing from high to low represent a cooling timing profile, and the measured values of fly height that occur as a result of the heater power changing from low to high represent a heating timing profile.

In accordance with aspects of the present disclosure, control circuitry 22 determines one or more mathematical expressions that fit the measured data of the cooling timing profile and the heating timing profile. In one example, control circuitry 22 performs a first curve fit operation that determines a first mathematical expression that characterizes the cooling timing profile and a second mathematical expression that characterizes the heating timing profile. Plot 340 of FIG. 3 shows a representation 341' of a first mathematical expression 341 associated with the cooling timing profile and a representation 342' of a second mathematical expression 342 associated with the heating timing profile. In this example, the first and second mathematical expressions 341 and 342 are determined by control circuitry 22 using an exponential curve fit, although other curve fitting techniques may be used. In embodiments, each of the mathematical expressions 341 and 342 may take the form of Equation 1.

$$FHC = A^* \exp(B^*X) + C^* \exp(D^*X) \tag{1}$$

In Equation 1, FHC is the fly height change, A, B, C, and D represent parameters determined using the curve fit, and X is the number of sectors during which this level of heater power change has been applied. In embodiments, each of the mathematical expressions for each of the calibrations has its own determined values for A, B, C, and D, which are determined using curve fitting to the measured data. For example, mathematical expression 341 has a respective set of values determined for A, B, C, and D based on curve-fitting a subset of data 332 corresponding to the cooling transient, and mathematical expression 342 has a respective set of values determined for A, B, C, and D based on curve-fitting a subset of data 332 corresponding to the heating transient.

Figure 4:
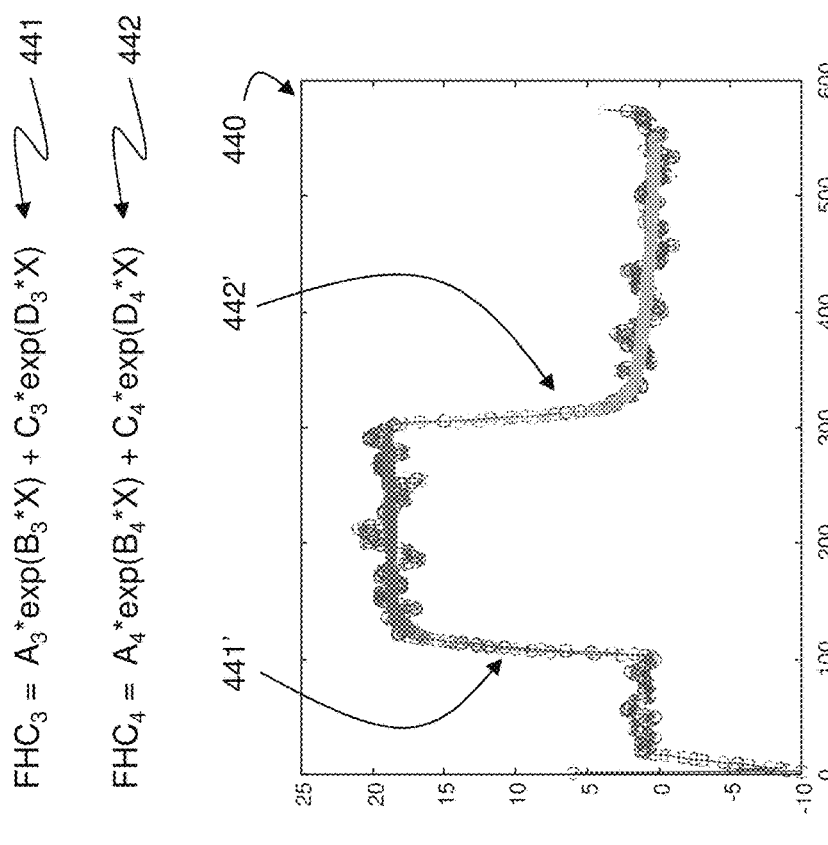
FIG. 4 shows another example of measuring values of fly height that occur over time as a result of another level of heater power change in accordance with various aspects of the present disclosure.
Figure 4:
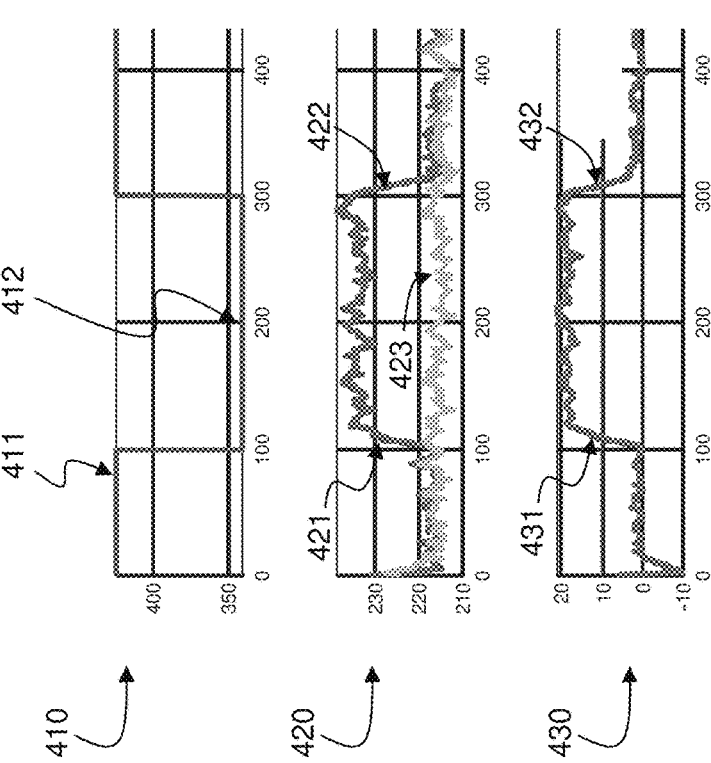

FIG. 4 shows another example of measured values of fly height that occur over time as a result of another level of heater power change. In the example shown in FIG. 4, plot 410 shows heater power on the vertical axis versus time on the horizontal axis. In this example, heater power is expressed in terms of heater DAC value and time is expressed in terms of SID. In this example, the heater power is applied at a first value 411 during sectors 0 through 100, then changed to a second value 412 during sectors 100 through 300, and then changed back to the first value 411 after sector 300. In this example, the first value 411 is higher than the second value 412, the first value 411 represents the target clearance heater power (e.g., a heater DAC value of 420), and the second value 412 represents a level of heater power change of 20% (a heater DAC value of 336).

With continued reference to FIG. 4, plot 420 shows measured values of SVGA signal associated with head 218 that result from to the heater power levels of plot 410 being applied to the heater of fly height actuator 250 in head 218. In this example, first data 421 in plot 320 is a raw measurement of the SVGA signal that results from the heater power levels of plot 410 being applied to the heater. Second data 422 in plot 420 is a filtered raw measurement of the SVGA signal that results from the heater power levels of plot 410 being applied to the heater. Third data 423 in plot 420 is a measurement of the baseline SVGA signal that results from the heater power being applied at the first value 411 during sectors 0 through 580. Comparing plots 410 and 420 shows that decreasing the heater power from first level 411 to second level 412 increases the fly height, while increasing the heater power from second level 412 to first level 411 decreases the fly height.

With continued reference to FIG. 4, plot 430 shows values of the SVGA signal with the baseline removed. In this example, first data 431 in plot 430 corresponds to first data 421 of plot 420 minus third data 423 of plot 420 (e.g., raw minus baseline). In this example, second data 432 in plot 430 corresponds to second data 422 of plot 420 minus third data 423 of plot 420 (e.g., filtered minus baseline).

With continued reference to FIG. 4, plot 440 shows a representation 441' of a first mathematical expression 441 associated with the cooling timing profile and a representation 442' of a second mathematical expression 442 associated with the heating timing profile. In this example, the first and second mathematical expressions 441 and 442 are determined by control circuitry 22 using an exponential curve fit and may have the form shown in Equation 1, although other curve fitting techniques may be used. For example, mathematical expression 441 has a respective set of values determined for A, B, C, and D based on curve-fitting a subset of data 432 corresponding to the cooling transient, and mathematical expression 442 has a respective set of values determined for A, B, C, and D based on curve-fitting a subset of data 432 corresponding to the heating transient.

FIGS. 3 and 4 illustrate examples of data used in determining respective calibrations for two different levels of heater power change, i.e., a 100% level of heater power change in FIG. 3 and a 20% level of heater power change in FIG. 4. Although not shown, control circuitry 22 may perform similar operations and collect similar data to determine other respective calibrations for other levels of heater power change, such as 10%, 30%, 40%, 50%, 60%, 70%, 80%, and 90%. In some embodiments, control circuitry 22 may perform linear scaling (e.g., extrapolation from other calibrations) to determine calibration for levels of heater power change less than 10%, since the measurements for such small heater power changes can be too noisy. In some embodiments, control circuitry 22 may perform linear scaling (e.g., extrapolation from other calibrations) to determine calibration for levels of heater power change greater than 100%, e.g., to determine calibrations for boost situations.

In accordance with further aspects of the present disclosure, determining a respective calibration for a respective level of heater power change may further comprise determining a first relationship between heater DAC value and magnitude of head protrusion based on the first mathematical expression and determining a second relationship between heater DAC value and magnitude of head protrusion based on the second mathematical expression. In embodiments, control circuitry 22 may determine a calibration of heater power efficiency including a relationship between magnitude of head protrusion (e.g., in picometers) and heater power slopes, where fly height may be determined from magnitude of head protrusion and vice versa.

After determining the plural calibrations for disk drive 15 in the manner described herein, disk drive 15 may be put into use by an end user, e.g., to perform read and write operations involved in storing and accessing user data. In accordance with aspects of the present disclosure, when performing such operations, control circuitry 22 is configured to store heater power history data that defines respective levels of heater power applied during the most recent "n" number of sectors over which the head has traveled. In embodiments, the heater power history data for a respective sector of disk 216 comprises the heater power level (e.g., heater DAC value) applied to the heater in fly height actuator 250 when head 218 is passing over the respective sector. In embodiments, control circuitry 22 maintains and updates a first-in-first-out buffer that stores this data for the last "n" number of sectors that head 218 has traveled over. In embodiments, the number "n" is 100, however other values may be used. In embodiments, the number "n" is a configurable parameter of the disk drive 15.

In accordance with aspects of the present disclosure, control circuitry 22 is configured to use the heater power history data and selected ones of the calibrations to predict a fly height of head 218 for a sector in real time during a seek. In embodiments, control circuitry 22 is configured to obtain the heater power history data (e.g., by accessing the buffer that stores the data), select one or more of the calibrations based on the one or more heater power levels defined in the heater power history data, and determine a predicted fly height head 218 over a target sector using the selected one or more calibrations and the heater power history data.

In embodiments, the control circuitry selects one or more of the calibrations that are associated with changes in heater power that correspond to the levels of heater power applied in the most recent "n" number of sectors as indicated in the heater power history data. An exemplary use case is described to illustrate this selection. In the exemplary use case, the heater power history data indicates that the heater power level was a heater DAC value of 0 at sector 1, was a heater DAC value of 420 at sectors 2 through 50, and was a heater DAC value of 336 at sectors 51 through 100. In this example, control circuitry 22 selects the 100% change heating calibration for sectors 2 through 50, and control circuitry 22 selects the 20% change cooling calibration for sectors 51 through 100. In this example, control circuitry 22 may use the mathematical expression associated with the heating timing profile in the 100% heating level change calibration (e.g., mathematical expression 342 of FIG. 3) to determine a predicted fly height of head at each of sectors 2 through 50. In this example, control circuitry 22 may use the mathematical expression associated with the cooling timing profile in the 20% heating level change calibration (e.g., mathematical expression 441 of FIG. 4) to determine a predicted fly height of head at each of sectors 51 through 100. In this manner, control circuitry 22 may determine a predicted fly height of head 218 at sector 50 using the mathematical expression associated with the heating timing profile in the 100% heating level change calibration (e.g., mathematical expression 342 of FIG. 3), using a value of 49 for X since that is the number of sectors during which this heater power level has been applied (i.e., since the last heater power level change), and adding the determined value of FHC to the fly height from sector 1. In this example, control circuitry 22 may further determine a predicted fly height of head 218 at sector 100 using the mathematical expression associated with the heating timing profile in the 20% cooling level change calibration (e.g., mathematical expression 441 of FIG. 4), using a value of 50 for X since that is the number of sectors during which this heater power level has been applied (i.e., since the last heater power level change), and adding the determined value of FHC to the fly height from sector 50.

Figure 5:
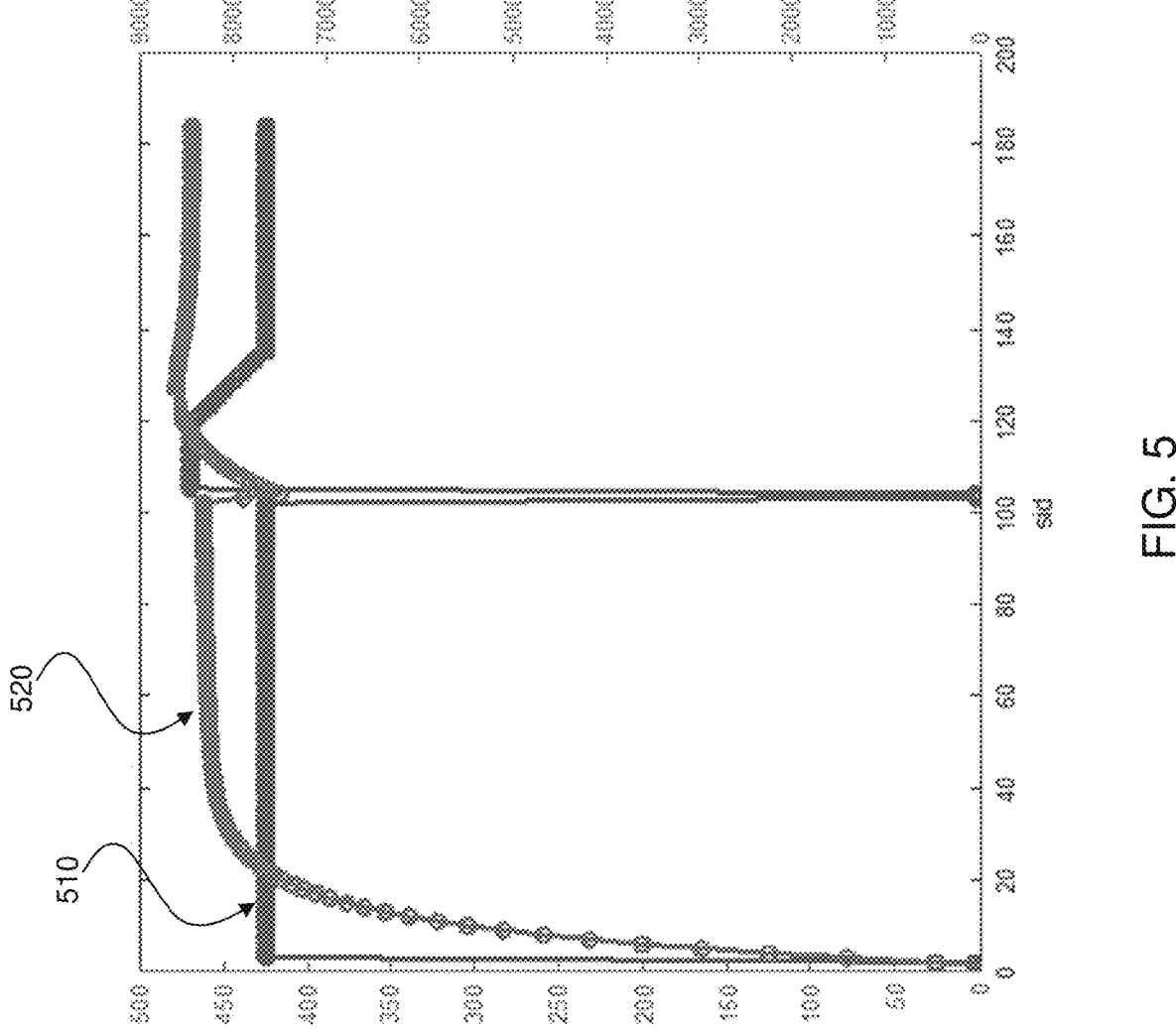
FIG. 5 shows an exemplary plot of heater power level versus time and an exemplary plot of head protrusion size versus time in accordance with various aspects of the present disclosure.

FIG. 5 shows an exemplary plot 510 of heater power level versus time and an exemplary plot 520 of head protrusion size versus time. In FIG. 5, the left-side vertical axis represents heater power level in terms of heater DAC value, the right-side vertical axis represents head protrusion size in terms of picometers, and the horizontal axis represents time in terms of SID. In the example shown in FIG. 5, plot 510 represents the heater power history data that defines historic levels of heater power applied to the heater in head 218 at various sectors of disk 216 during operations. In the example shown in FIG. 5, the heater power level undergoes a 100% heating change at sector 1 (e.g., from a heater DAC value of 0 to 420), the heater power level undergoes a 100% cooling change at sector 101, the heater power level undergoes a 110% heating change at sector 102, and the heater power level undergoes a 1% cooling change at each of sectors 121 through 136. In the example shown in FIG. 5, control circuitry 22 selects a first calibration for sectors 1-100 (e.g. the 100% change heating calibration), a second calibration for sectors 101 and 102 (e.g. the 100% change cooling calibration), a third calibration for sectors 103-120 (e.g. the 110% change heating calibration), and so on. In the example of FIG. 5, control circuitry 22 determines the values of plot 520 using the respective mathematical expressions associated with the selected calibrations for the ranges of sectors, e.g., in the manner described above, and by converting the determined fly height to protrusion size.

In accordance with aspects of the present disclosure, when selecting the one or more calibrations to use for determining the predicted fly height for a target sector, if a level of heater power change from one sector to the next sector is greater than a predefined amount, then a different calibration is selected for the next sector. In embodiments, the predefined amount is 0.5% of read clearance power. In embodiments, control circuitry 22 adjusts the new timing constant equation scaling and DC offset based on previous fly height and target fly height.

In accordance with aspects of the present disclosure, when determining the predicted fly height of head 218 for a target sector during a seek operation, control circuitry 22 calculates the correlated fly height of head 218 at each sector of the number "n" of most recent sectors using the mathematical expressions associated with the selected calibrations, and control circuitry 22 calculates the predicted fly height of head 218 at the next sector in the seek using the mathematical expressions associated with the selected calibration for the most recent one of the "n" number of sectors. For example, when "n" equals 100 and head 218 is passing over the sectors in the order of 1, 2, 3, . . . , 98, 99, 100, control circuitry 22 determines the predicted fly height for each of the sectors 1 through 100 using the mathematical expressions associated with the selected calibrations, and control circuitry 22 determines the predicted fly height for sector 101 using the same mathematical expression that was used with sector 100.

In embodiments, during a seek operation, if the predicted fly height of the next sector is within a tolerance of an expected value, then the control circuitry performs the read or write operation associated with the next sector. In embodiments, during a seek operation, if the predicted fly height of the next sector not within a tolerance of the expected value, then the control circuitry performs an alternate action, such as aborting the operation, adjusting the heater power, or adjusting the duration of the heater power. The expected value may be predefined for different operations. For example, control circuitry 22 may store data defining a first expected value associated with the first sector of a read operation, control circuitry 22 may store data defining a second expected value associated with the first sector of a write operation. The tolerance may be a predefined value defined by data stored by control circuitry 22.

Implementations have been described so far with respect to fly height changes that result from changes in heater power applied to a heater in a fly height actuator. Other implementations may be realized by determining calibrations in a manner similar to that described herein for other elements in head 218 that affect the fly height through thermal changes. One example is determining calibrations in a manner similar to that described herein for fly height changes of head 218 due to heating effects of a laser diode in a HAMR disk drive. By implementing such real-time fly height predictors, control circuitry 22 may be configured to perform remediation actions when an excursion from an expected fly height occurs.

In some implementations, control circuitry 22 is configured to perform the steps of method 80 of FIG. 2C continuously as the disk drive 215 is operated by a user. In some other implementations, control circuitry 22 is configured to perform the steps of method 80 of FIG. 2C only when in a special mode, such as a test mode, and not continuously during normal operations by a user. In this manner, the memory usage and calculation time involved in the steps of the method are incurred only during the test mode and not during normal operations.

In some implementations, control circuitry 22 is configured to perform the steps of method 80 of FIG. 2C during a seek in order to predict the fly height of a first sector of a read or write operation. In some other implementations, control circuitry 22 is configured to perform the steps of method 80 of FIG. 2C during the read or write operation. In this manner, the method can be used to check for excursions that result from a coding error that programs an incorrect heater value at one or more sectors. In one example, a reference for the excursion is the target read or write clearance heater power or laser power.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner.

Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable.

The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
one or more disks;
an actuator mechanism configured to position a selected head among one or more heads proximate to a corresponding disk surface of a corresponding disk among the one or more disks, the selected head including a heater associated with adjusting a fly height of the selected head; and
one or more processing devices, individually or in combination, configured to:
store heater power history data defining historic levels of heater power applied to the heater in the selected head;
based on the heater power history data, select one or more calibrations from plural calibrations that define relationships between the fly height of the selected head and different levels of heater power change; and
determine a predicted fly height of the selected head over a target sector of the one or more disks using the selected one or more calibrations and the heater power history data,
wherein the selecting and the determining are performed during a seek operation in which an ending point of the seek operation is changed after the seek operation has commenced.

2. The data storage device of claim 1, wherein the one or more processing devices, individually or in combination, are further configured to store the heater power history data associated with a predefined number of sectors.

3. The data storage device of claim 2, wherein the predefined number is a configurable parameter of the data storage device.

4. The data storage device of claim 1, wherein the one or more processing devices, individually or in combination, are further configured to:
compare the predicted fly height to an expected fly height; and
based on determining the predicted fly height is within a predefined tolerance of the expected fly height, perform a read operation or a write operation at the target sector.

5. The data storage device of claim 1, wherein the one or more processing devices, individually or in combination, are further configured to:
compare the predicted fly height to an expected fly height; and
based on determining the predicted fly height is not within a predefined tolerance of the expected fly height, perform an alternative action.

6. The data storage device of claim 5, wherein the alternative action comprises one of:
abort a read operation or a write operation at the target sector;
adjust a level of heater power being applied to the heater; or
adjust a duration of heater power being applied to the heater.

7. The data storage device of claim 1, wherein the one or more processing devices, individually or in combination, are further configured to:
determine the plural calibrations; and
store data defining the plural calibrations in persistent memory associated with the data storage device.

8. The data storage device of claim 7, wherein the plural calibrations are determined during manufacturing of the data storage device.

9. The data storage device of claim 7, wherein the determining the plural calibrations comprises determining a respective calibration for a respective level of heater power change for plural different levels of heater power change.

10. The data storage device of claim 9, wherein the determining the respective calibration for the respective level of heater power change comprises:
obtaining a heating timing profile that comprises first measured values of the fly height of the selected head that occur over time as a result of the respective level of heater power change from a first low value to a second high value; and
obtaining a cooling timing profile that comprises second measured values of the fly height of the selected head that occur over time as a result of the respective level of heater power change from the second high value to the first low value.

11. The data storage device of claim 10, wherein the determining the respective calibration for the respective level of heater power change further comprises:

determining a first mathematical expression that fits the heating timing profile; and determining a second mathematical expression that fits the cooling timing profile.

12. The data storage device of claim 11, wherein the determining the respective calibration for the respective level of heater power change further comprises:

determining a first relationship between heater digital-to-analog converter value and magnitude of head protrusion based on the first mathematical expression; and determining a second relationship between heater digital-to-analog converter value and magnitude of head protrusion based on the second mathematical expression.

13. The data storage device of claim 1, wherein the selecting and the determining are performed during a seek operation.

14. A method comprising:

determining plural calibrations that define relationships between a fly height of a selected head and different levels of heater power change in a data storage device, wherein the plural calibrations are determined using measured values of the fly height of the selected head that occur over time as a result of applying respective ones of the levels of heater power change from a respective first value to a respective second value;

storing heater power history data defining historic levels of heater power applied to a heater in the selected head;

based on the heater power history data, selecting one or more calibrations from the plural calibrations;

determining a predicted fly height of the selected head over a target sector of one or more disks using the selected one or more calibrations and the heater power history data, wherein the determining the plural calibrations, the storing, the selecting, and the determining the predicted fly height are performed by one or more processing devices individually or in combination.

15. The method of claim 14, further comprising the one or more processing devices, individually or in combination, performing:

comparing the predicted fly height to an expected fly height; and based on the comparing, performing one of:

in response to determining the predicted fly height is within a predefined tolerance of the expected fly height, performing a read operation or a write operation at the target sector; or in response to determining the predicted fly height is not within a predefined tolerance of the expected fly height, performing an alternative action.

16. The method of claim 14, wherein the determining the plural calibrations comprises determining a respective calibration for a respective level of heater power change for plural different levels of heater power change.

17. The method of claim 14, wherein the selecting and the determining the predicted fly height are performed during a seek operation in which an ending point of the seek operation is changed after the seek operation has commenced.

18. One or more processing devices comprising, individually or in combination:

means for storing heater power history data defining historic levels of heater power applied to a heater in a selected head in a data storage device;

means for selecting, based on one or more changes in levels of heater power in the heater power history data, one or more calibrations from plural calibrations that define relationships between the fly height of the selected head and different levels of heater power change; and means for determining a predicted fly height of the selected head over a target sector of one or more disks using the selected one or more calibrations and the heater power history data.

19. The one or more processing devices of claim 18, further comprising, individually or in combination:

means for comparing the predicted fly height to an expected fly height;

means for performing a read operation or a write operation at the target sector responsive to determining the predicted fly height being within a predefined tolerance of the expected fly height; and means for performing an alternative action responsive to determining the predicted fly height being not within a predefined tolerance of the expected fly height.

20. The one or more processing devices of claim 18, further comprising, individually or in combination:

means for determining the plural calibrations; and means for storing data defining the plural calibrations in persistent memory associated with the data storage device.

21. The one or more processing devices of claim 20, wherein the means for determining the plural calibrations comprises means for determining a respective calibration for a respective level of heater power change for plural different levels of heater power change.

22. The one or more processing devices of claim 18, wherein the selecting and the determining are performed during a seek operation in which an ending point of the seek operation is changed after the seek operation has commenced.

* * * * *